United States Patent
Van Den Berg

(10) Patent No.: US 12,455,009 B2
(45) Date of Patent: Oct. 28, 2025

(54) METHOD FOR BUILDING A SEALED STRUCTURE COMPRISING TWO TUBULAR MEMBERS, A SEALED STRUCTURE, AN OFFSHORE WIND TURBINE AND A SEALING SYSTEM

(71) Applicant: TRELLEBORG RIDDERKERK B.V., Ridderkerk (NL)

(72) Inventor: Leendert Jurriaan Van Den Berg, Ridderkerk (NL)

(73) Assignee: TRELLEBORG RIDDERKERK B.V., Ridderkerk (NL)

( * ) Notice: Subject to any disclaimer, the term of this patent is extended or adjusted under 35 U.S.C. 154(b) by 31 days.

(21) Appl. No.: 17/926,079

(22) PCT Filed: Jun. 3, 2021

(86) PCT No.: PCT/EP2021/064925
§ 371 (c)(1),
(2) Date: Nov. 17, 2022

(87) PCT Pub. No.: WO2021/249868
PCT Pub. Date: Dec. 16, 2021

(65) Prior Publication Data
US 2023/0193996 A1    Jun. 22, 2023

(30) Foreign Application Priority Data
Jun. 11, 2020 (NL) ...................................... 2025813

(51) Int. Cl.
*F03D 13/20* (2016.01)
*F16J 15/02* (2006.01)
(Continued)

(52) U.S. Cl.
CPC ............ *F16J 15/025* (2013.01); *F03D 13/22* (2016.05); *F16J 15/3232* (2013.01);
(Continued)

(58) Field of Classification Search
CPC .............. F05B 2240/97; F05B 2240/95; E02B 2017/0091; E02B 2017/0065; F16J 15/3232; F16J 15/025; F03D 13/22
See application file for complete search history.

(56) References Cited

U.S. PATENT DOCUMENTS

| | | | |
|---|---|---|---|
| 2,402,114 A * | 6/1946 | Sprankl | F16J 15/3252 |
| | | | 277/575 |
| 2,897,533 A * | 8/1959 | Bull | B60R 16/0222 |
| | | | 277/606 |

(Continued)

FOREIGN PATENT DOCUMENTS

| | | | | |
|---|---|---|---|---|
| EP | 2672016 A1 | 12/2013 | | |
| GB | 2433540 A * | 6/2007 | ............. | E02D 27/52 |

(Continued)

OTHER PUBLICATIONS

International Search Report and Written Opinion, dated Jun. 11, 2020, for Application No. PCT/EP2021/064925 (eight (8) pages).

(Continued)

*Primary Examiner* — Eugene G Byrd
(74) *Attorney, Agent, or Firm* — KDW Firm PLLC

(57) ABSTRACT

A sealing system for use in an offshore wind turbine includes two interconnected tubular members, and a flexible sealing member. The flexible sealing member includes, seen in cross section: an annular attachment part; an annular strip shaped sealing part which is connected to said attachment part by means of an annular hinge portion of said sealing part, and which sealing part extends away from said attachment part in a direction which has a first component in a direction which is parallel to the axis of the annular attachment part; and an annular strip shaped actuator part extending from said hinge portion of said sealing part in a direction which has a component in the radial direction.

17 Claims, 3 Drawing Sheets

(51) Int. Cl.
*F16J 15/3232* (2016.01)
*E02B 17/00* (2006.01)

(52) U.S. Cl.
CPC ............ *E02B 2017/0065* (2013.01); *E02B 2017/0091* (2013.01); *F05B 2240/95* (2013.01); *F05B 2240/97* (2013.01)

(56) References Cited

U.S. PATENT DOCUMENTS

| | | | | |
|---|---|---|---|---|
| 3,345,076 | A * | 10/1967 | Wheelock | F16J 15/3232 15/104.001 |
| 3,493,237 | A * | 2/1970 | Kleindienst | F16L 13/116 285/379 |
| 3,909,018 | A * | 9/1975 | Chaplain | F16J 15/024 277/615 |
| 4,014,556 | A * | 3/1977 | Anderson | F16J 15/025 277/626 |
| 4,227,704 | A * | 10/1980 | Blaha | F16J 15/3268 188/18 R |
| 4,441,724 | A * | 4/1984 | Taylor | F16J 15/025 277/639 |
| 5,205,568 | A | 4/1993 | Stoll | |
| 6,457,725 | B1 * | 10/2002 | Jones | E03F 5/021 277/606 |
| 9,714,710 | B2 * | 7/2017 | Fei | F16J 15/164 |
| 9,759,330 | B2 * | 9/2017 | Berdichevsky | F16J 15/3208 |
| 2001/0010417 | A1 * | 8/2001 | Goto | F16J 15/025 277/637 |
| 2005/0029752 | A1 * | 2/2005 | Arata | B60J 10/75 277/649 |
| 2007/0007731 | A1 | 1/2007 | Zhan | |
| 2008/0303224 | A1 * | 12/2008 | Knapp | F16J 15/061 277/627 |
| 2009/0001675 | A1 * | 1/2009 | Higashi | F01P 3/18 277/650 |
| 2011/0241296 | A1 | 10/2011 | Ting et al. | |
| 2016/0146030 | A1 * | 5/2016 | Bifulco | F01D 11/003 277/594 |
| 2018/0298772 | A1 * | 10/2018 | Ratajac | F16J 15/065 |

FOREIGN PATENT DOCUMENTS

| | | | |
|---|---|---|---|
| JP | 2018168998 | A * | 11/2018 |
| KR | 20130012106 | A | 2/2013 |
| KR | 20160007698 | A | 1/2016 |
| WO | 2013057459 | A1 | 4/2013 |

OTHER PUBLICATIONS

International Preliminary Report on Patentability for the International Application No. PCT/EP2021/064925, dated Dec. 13, 2022, 6 pages.

* cited by examiner

METHOD FOR BUILDING A SEALED STRUCTURE COMPRISING TWO TUBULAR MEMBERS, A SEALED STRUCTURE, AN OFFSHORE WIND TURBINE AND A SEALING SYSTEM

This application is a national stage filing under 35 U.S.C. 371 of pending International Application No. PCT/EP2021/064925, filed Jun. 3, 2021, which claims priority to Netherlands Patent Application No. 2025813, filed Jun. 11, 2020, the entirety of which applications are incorporated by reference herein.

The invention relates to a method for building a sealed structure, comprising the steps of: providing two tubular members having different diameters; interconnecting said tubular members such that an outer end of a first one of said tubular members is connected to an outer end of a second one of said tubular members such that the outer end of one of said tubular members surrounds the other one of said tubular members while leaving a cylindrical gap between the surfaces of said tubular members; wherein said first tubular member is provided with a sealing system for preventing fluid to enter from the environment to the interior of the structure, said sealing system comprising a flexible sealing member extending along a surface adjacent the outer end of said first tubular member. In particular the invention relates to an offshore wind turbine, wherein said offshore wind turbine comprises a monopile which is installed in the seabed, a tubular tower carrying the turbine, and a transition piece which forms the connection between the monopile and the tubular tower, and wherein said two tubular members are the monopile and the transition piece.

Wind energy is one of the solutions to meet the ever growing demand for renewable energy. At the same time, due to the scarcity of land, a large part of the required capacity of wind energy is to be installed offshore. Therefore, large offshore wind farms, comprising large amounts of offshore wind turbines, are constructed, under construction or in development. A typical offshore wind turbine will comprise of a Rotor-Nacelle-Assembly (RNA) and an offshore support structure, comprising of a tubular tower and offshore foundation. To date, monopile-based foundations make up the largest part of these offshore foundations. In the first stage of installation of such a monopile foundation, a monopile is installed in the seabed and as a second stage, the transition piece, which forms the connection between the monopile and the tubular tower, is installed. The current invention in particular relates to the connection between the monopile and the transition piece.

These offshore wind turbines have to deal with the harsh offshore conditions during their entire designed lifetime and, it is not hard to imagine, that corrosion is one of the worst enemies of such a structure. Therefore, it is essential to shield the structure using thick layers of coatings or paint, anodes or other solutions. In addition, any fluid, from for instance waves slamming on the structure, that is allowed to enter from the environment to the interior of the structure typically leads to corrosion on the tubular members and their interior components, thereby negatively influencing the life time of these structures. It is an objective of the invention to address the above mentioned problems.

To that end the flexible sealing member comprises, seen in cross section and before the tubular members are interconnected: an annular attachment part which is attached to a surface of the first tubular member; an annular strip shaped sealing part which is connected to said attachment part by means of an annular hinge portion of said sealing part, and which sealing part extends away from said attachment part in a direction which has a first component in a direction which is parallel to the axis of the first tubular member towards the outer end of said first tubular member; and an annular strip shaped actuator part extending from said hinge portion of said sealing part in a direction which has a component in the radial direction towards the second tubular member, wherein the radial width of the sealing member including the actuator part is larger than the width of the gap between the tubular members in the mounted state.

Interconnecting said tubular members comprises moving the outer end of the first tubular member towards and past the outer end of the second tubular member, whereby said actuator part of said sealing member is engaged and moved by the outer end of the second tubular member, such that said actuator part deforms the hinge portion of said sealing part during said movement, whereby, after the tubular members are interconnected: said sealing part extends away from said attachment part towards and onto the surface of the second tubular member in an oblique direction which has a first component in a direction which is parallel to the axis of the first tubular member towards the outer end of said first tubular member, and which has a second component in the radial direction towards the second tubular member; and said actuator part extends from said hinge portion of said sealing part towards and onto the surface of the second tubular member, in an oblique direction which has a first component in a direction which is parallel to the axis of the first tubular member away from the outer end of said first tubular member, and which has a second component in the radial direction towards the second tubular member.

The invention also relates to a structure comprising two interconnected tubular members having different diameters, wherein an outer end of a first one of said tubular members is connected to an outer end of a second one of said tubular members such that the outer end of one of said tubular members surrounds the other one of said tubular members while leaving a cylindrical gap between the surfaces of said tubular members; wherein said first tubular member is provided with a sealing system for preventing fluid to enter from the environment to the interior of the structure, said sealing system comprising a flexible sealing member extending along a surface adjacent the outer end of said first tubular member; wherein the flexible sealing member comprises, seen in cross section: an annular attachment part which is attached to a surface of the first tubular member; an annular strip shaped sealing part which is connected to said attachment part by means of an annular hinge portion of said sealing part, and which sealing part extends away from said attachment part towards and onto the surface of the second tubular member in an oblique direction which has a first component in a direction which is parallel to the axis of the first tubular member towards the outer end of said first tubular member, and which has a second component in the radial direction towards the second tubular member; an annular strip shaped actuator part extending from said hinge portion of said sealing part towards and onto the surface of the second tubular member, in an oblique direction which has a first component in a direction which is parallel to the axis of the first tubular member away from the outer end of said first tubular member, and which has a second component in the radial direction towards the second tubular member.

Furthermore the invention relates to a sealing system for use in the above method or the above structure, said sealing system comprising a flexible sealing member, wherein the flexible sealing member comprises, seen in cross section: an annular attachment part; an annular strip shaped sealing part which is connected to said attachment part by means of an annular hinge portion of said sealing part, and which sealing part extends away from said attachment part in a direction which has a first component in a direction which is parallel to the axis of the annular attachment part; an annular strip shaped actuator part extending from said hinge portion of said sealing part in a direction which has a component in the radial direction.

Preferably said strip shaped actuator part is provided with a thickened portion at its radial outer end. Preferably said sealing member is designed such that said thickened portion engages said attachment part, after the tubular members are interconnected. Preferably said sealing member is made of rubber, such as SBR, EPDM, NR or CR rubber. Preferably said first tubular member is the transition piece of the wind turbine. Preferably said first tubular member has a larger diameter than the second tubular member. If said sealing system is at least occasionally or permanently submerged in water, said sealing part of said sealing member preferably extends away from said attachment part in a direction having a component in the direction of the water.

The invention will now be explained in detail with reference to figures illustrated in the accompanying drawings, wherein.

Figure 1:
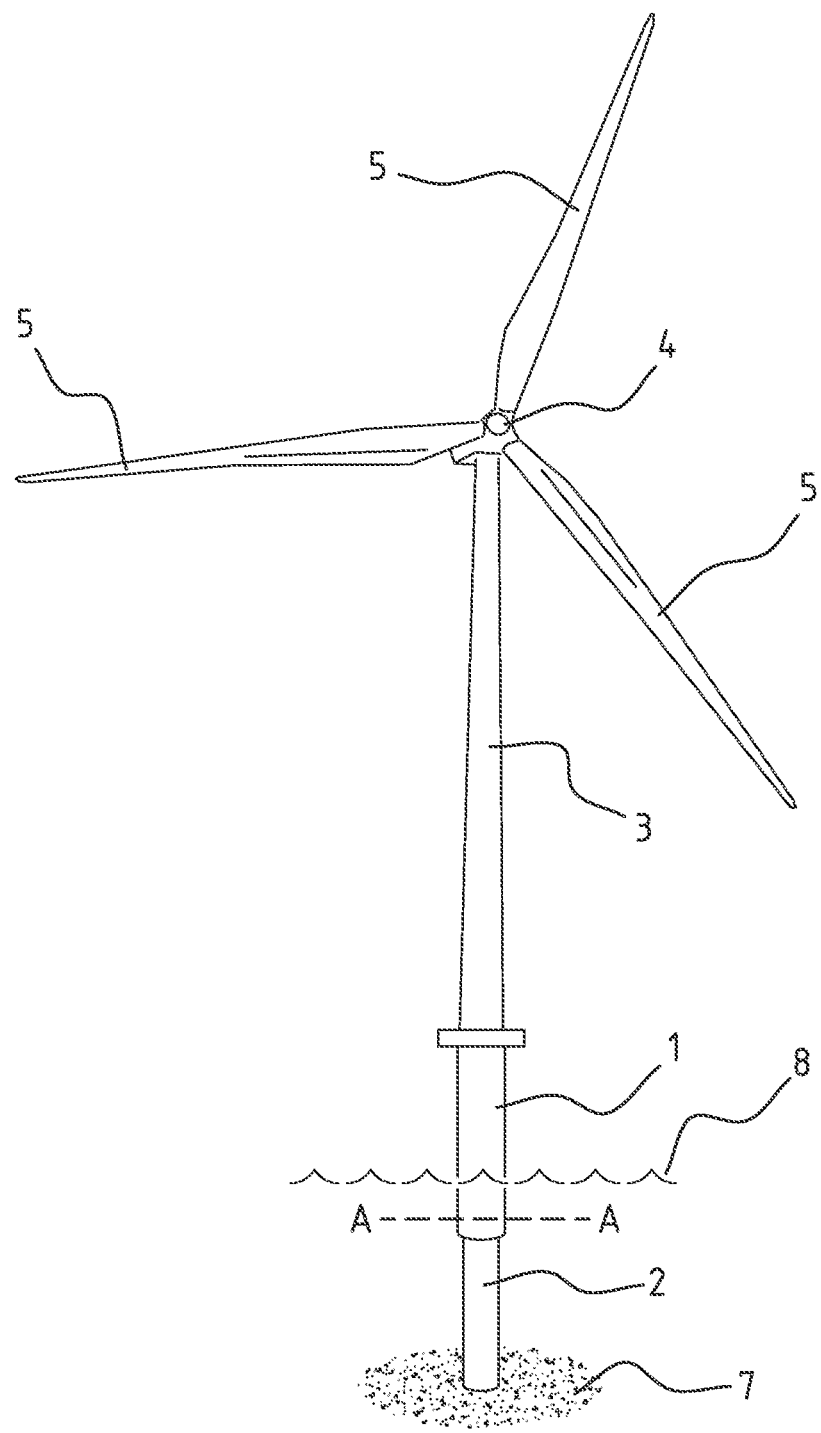
FIG. 1 shows a front view of an offshore wind turbine.

FIG. 1 shows a front view of an offshore wind turbine comprising a transition piece 1 which forms the connection between the monopile 2 and the tubular tower 3 which carries the turbine 4 with the blades 5. The monopile is in this example piled into the seabed 7. The transition between the monopole 1 and the transition piece 2 extends possibly below the sea level 8.

Figure 2:
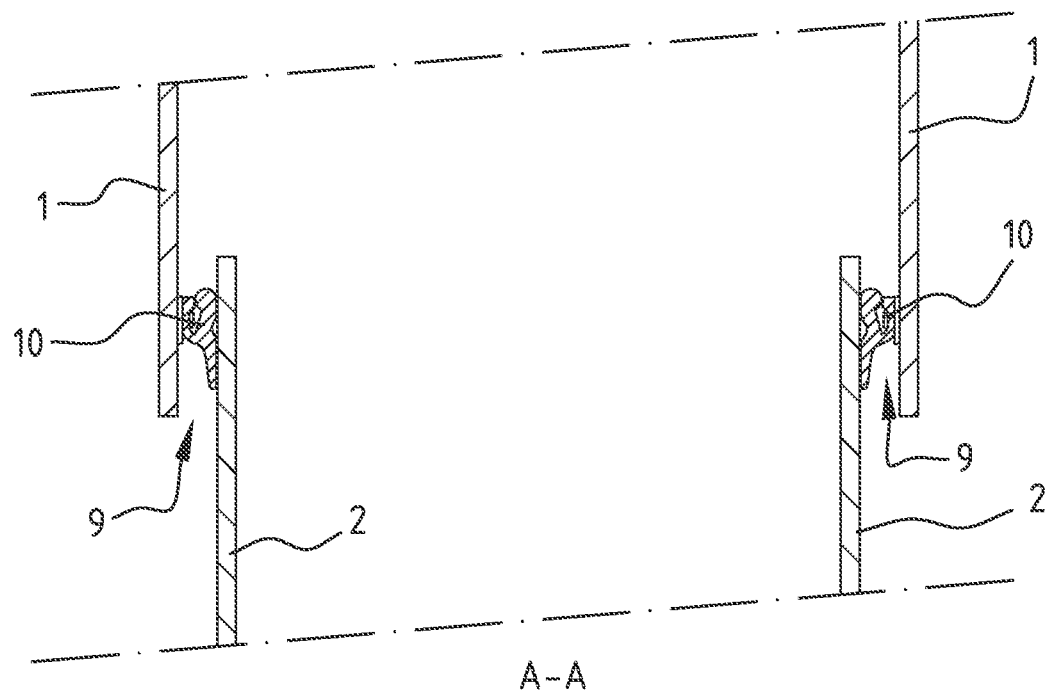
FIG. 2 shows a cross-section of the sealing system of the wind turbine of FIG. 1.

FIG. 2 shows a cross-section of the sealing system according to the invention in combination with two tubular members. In this example the first tubular member is the transition piece 1 and the second tubular member is the monopile 2. The two tubular members have different diameters, such that the outer end of the first tubular member 1 surrounds the second tubular member 2, while leaving a cylindrical gap 9 between the surfaces of said tubular members. The first tubular member 1 is provided with a sealing system 10 in said gap 9 which prevents seawater to enter from the sea to the interior of the structure.

Figure 3:
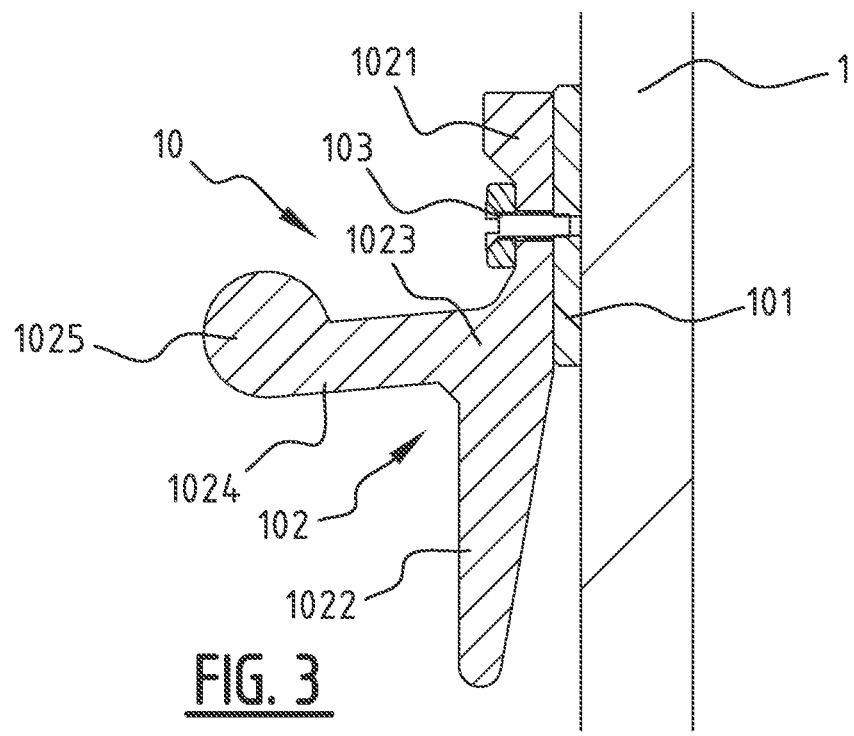
FIG. 3 shows a cross section of the sealing system of FIG. 2 before interconnecting the tubular members of the offshore wind turbine.

As shown in FIG. 3, the sealing system 10 may comprise a strip 101, preferably a metal strip, to which a rubber sealing member 102 is fixed by means of for instance screws 103. The strip 101 and the sealing member 102 are mounted to the surface of the first tubular member 1.

The sealing member 102 comprises an annular strip shaped attachment part 1021 which is attached to a surface of the first tubular member 1 via the strip 101. An annular strip shaped sealing part 1022 is connected to said attachment part 1021 by means of an annular hinge portion 1023 of the sealing part 1022. The sealing part 1022 extends away from the attachment part 1021 substantially in the same plane as the attachment part 1021 (i.e. substantially parallel to the axis of the first tubular member 1) and towards the outer end of the first tubular member 1.

An annular strip shaped actuator part 1024 extends from the hinge portion 1023 of the sealing part 1022 in the radial direction (i.e. substantially perpendicular to the axis of the first tubular member 1) towards the second tubular member 2. The actuator part 1024 is provided with a thickened portion 1025 at its radial outer end.

Figure 5:
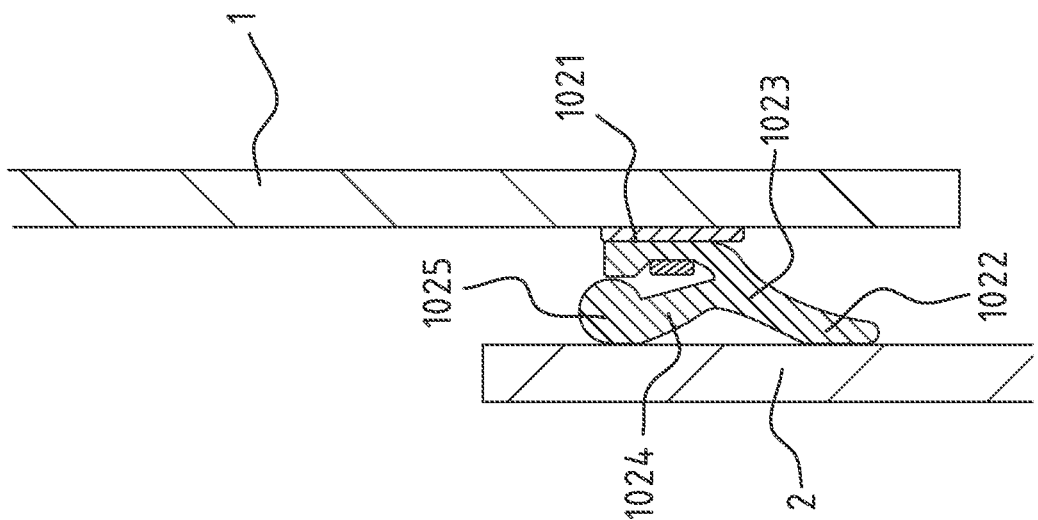
Figure 4:
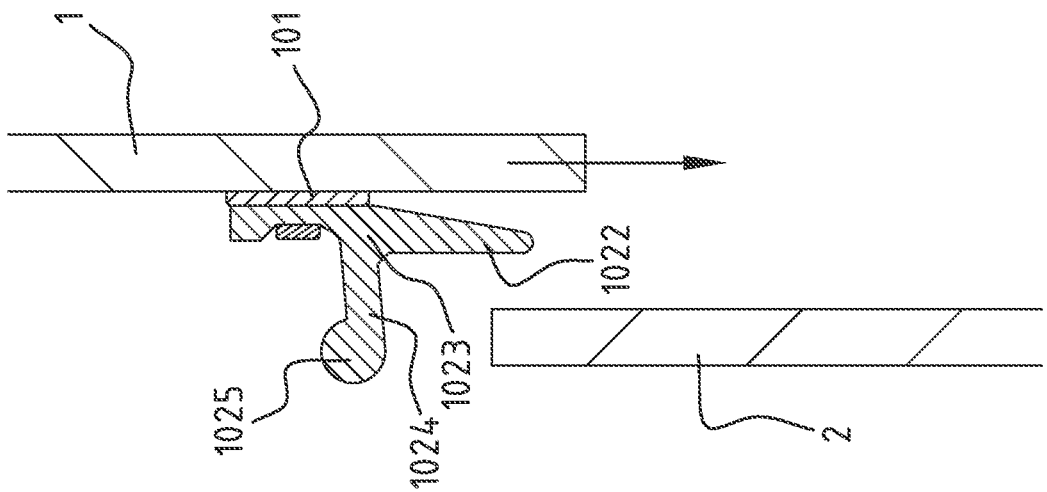

FIGS. 4 and 5 show that when the outer end of the first tubular member 1 is moved towards and past the outer end of the second tubular member 2. Since the radial width of the sealing member 102 is larger than the width of the gap 9 between the tubular members 1, 2, the actuator part 1024 is engaged and moved by the outer end of the second tubular member 2, such that said actuator part 1023 hinges towards the surface of the first tubular member 1 and deforms the hinge portion 1023 of the sealing part 1022.

As shown in FIG. 5, after the tubular members are interconnected the sealing part 1022 extends away from the attachment part 1021 in an oblique direction towards and onto the surface of the second tubular member 2, thereby forming a seal against the seawater.

Figure 6:
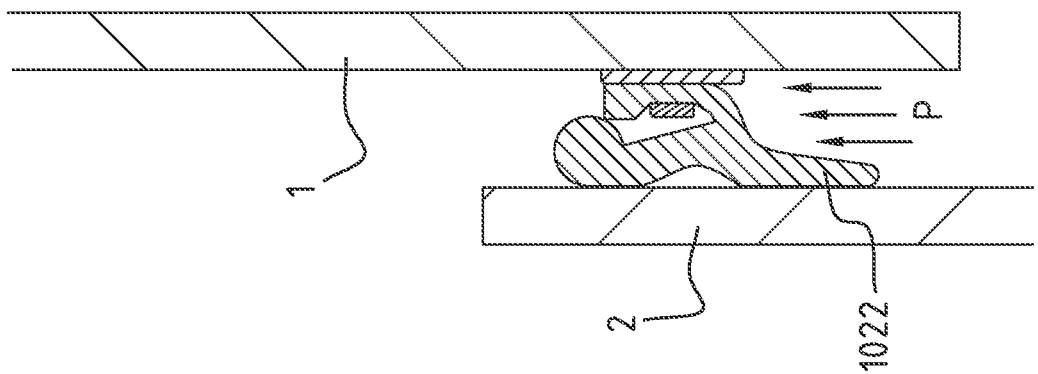
FIGS. 4, 5 and 6 show cross sections of the sealing system of FIG. 2 before and after interconnecting the tubular members of the offshore wind turbine.

As shown FIG. 6 the pressure P of the seawater may further deform the sealing part 1022 and press a larger surface area of the sealing part 1022 against the second tubular member 2, thereby enhancing the sealing properties of the sealing system 10. Depending on the width of the gap 9 the sealing member 102 may be more or less compressed when the tubular members 1, 2 are interconnected, but the deformation of the sealing part 1022 caused by the water pressure P ensures that also in case the gap 9 is relatively wide a good seal against the seawater is obtained. Thereby the sealing system allows for a relatively large tolerance of axial alignment when mutually fixing the tubular members 1, 2.

Also the actuator part 1024 extends from the hinge portion 1023 of the sealing part 1022 in an oblique direction towards and onto the surface of the second tubular member, and towards the outer end of the second tubular member 2. The thickened portion 2025 both the second tubular member 2 and the upper edge of the attachment part 1021, whereby a second seal may be provided depending on the gap 9 and furthermore the screws 103 may be sealed.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein. An element is to be considered equivalent to an element specified in the claims at least if said element performs substantially the same function in substantially the same way to yield substantially the same result as the element specified in the claims.

The invention claimed is:

1. A method for building a sealed structure of an offshore wind turbine, comprising the steps of:

providing two tubular members having different diameters, wherein said tubular members are support members for the turbine;

interconnecting said tubular members such that an outer end of a first one of said tubular members is connected to an outer end of a second one of said tubular members such that the outer end of one of said tubular members surrounds the other one of said tubular members while leaving a cylindrical gap between the surfaces of said tubular members;

wherein said first tubular member is provided with a sealing system for preventing fluid to enter from the environment to the interior of the structure, said sealing system comprising an annular strip which is fixed to a surface of the first tubular member and an integrally formed flexible sealing member, extending along a surface adjacent the outer end of said first tubular member, wherein the annular strip is a metal annular strip;

wherein the integrally formed flexible sealing member comprises, seen in cross section and before the tubular members are interconnected:
  an annular attachment part which is attached to the metal annular strip;
  an annular strip shaped sealing part which is connected to said attachment part by means of an annular hinge portion of said sealing part, and which sealing part extends away from said attachment part substantially in a direction which is parallel to the axis of the first tubular member towards the outer end of said first tubular member;
  an annular strip shaped actuator part extending from said hinge portion of said sealing part substantially in a radial direction towards the second tubular member, wherein the radial width of the sealing member including the actuator part is larger than the width of the gap between the tubular members in the mounted state;

where interconnecting said tubular members comprises moving the outer end of the first tubular member towards and past the outer end of the second tubular member, whereby said actuator part of said sealing member is engaged and moved by the outer end of the second tubular member, such that said actuator part deforms the hinge portion of said sealing part during said movement, whereby, after the tubular members are interconnected:
  said sealing part extends away from said attachment part towards and onto the surface of the second tubular member in an oblique direction between the direction which is parallel to the axis of the first tubular member towards the outer end of said first tubular member and the radial direction towards the second tubular member; and
  said actuator part extends from said hinge portion of said sealing part towards and onto the surface of the second tubular member, in an oblique direction between a direction which is parallel to the axis of the first tubular member away from the outer end of said first tubular member and the radial direction towards the second tubular member;
wherein the metal annular strip is coupled to the first tubular member prior to installation of the integrally formed flexible sealing member.

2. An offshore wind turbine structure comprising:
two interconnected tubular members having different diameters, wherein said tubular members are support members for the turbine, wherein an outer end of a first one of said tubular members is connected to an outer end of a second one of said tubular members such that the outer end of one of said tubular members surrounds the other one of said tubular members while leaving a cylindrical gap between the surfaces of said tubular members;

wherein said first tubular member is provided with a sealing system for preventing fluid to enter from the environment to the interior of the structure, said sealing system comprising an annular strip which is fixed to a surface of the first tubular member and an integrally formed flexible sealing member, extending along a surface adjacent the outer end of said first tubular member, wherein the annular strip is a metal annular strip;

wherein the integrally formed flexible sealing member comprises, seen in cross section:
  an annular attachment part which is attached to the metal annular strip;
  an annular strip shaped sealing part which is connected to said attachment part by means of an annular hinge portion of said sealing part, and which sealing part extends away from said attachment part towards and onto the surface of the second tubular member in an oblique direction between a direction which is parallel to the axis of the first tubular member towards the outer end of said first tubular member and a radial direction towards the second tubular member; and
  an annular strip shaped actuator part extending from said hinge portion of said sealing part towards and onto the surface of the second tubular member, in an oblique direction between a direction which is parallel to the axis of the first tubular member away from the outer end of said first tubular member and the radial direction towards the second tubular member;
wherein the metal annular strip is coupleable to the first tubular member prior to installation of the integrally formed flexible sealing member.

3. A sealing system for use in the method according to claim 1, said sealing system comprising a flexible sealing member, wherein the flexible sealing member comprises, seen in cross section:
  an annular attachment part;
  an annular strip shaped sealing part which is connected to said attachment part by means of an annular hinge portion of said sealing part, and which sealing part extends away from said attachment part in a direction which has a first component in a direction which is parallel to the axis of the annular attachment part; and
  an annular strip shaped actuator part extending from said hinge portion of said sealing part in a direction which has a component in the radial direction.

4. The method according to claim 1, wherein said strip shaped actuator part is provided with a thickened portion at its radial outer end.

5. The method according to claim 4, wherein said sealing member is designed such that said thickened portion engages said attachment part, after the tubular members are interconnected.

6. The method according to claim 1, wherein said flexible sealing member is made of rubber.

7. The offshore wind turbine structure according to claim 2, wherein said offshore wind turbine comprises a monopile which is installed in the seabed, a tubular tower carrying the turbine, and a transition piece which forms the connection between the monopile and the tubular tower, and wherein said two tubular members are the monopile and the transition piece.

8. The offshore wind turbine structure according to claim 7, wherein said first tubular member is the transition piece.

9. The offshore wind turbine structure according to claim 2, wherein said first tubular member has a larger diameter than the second tubular member.

10. The offshore wind turbine structure according to claim 2, wherein said sealing system is at least occasionally or permanently submerged in water and said sealing part of said sealing member extends away from said attachment part in a direction having a component in the direction of the water.

11. A sealing system for use in the offshore wind turbine structure according to claim 2, said sealing system comprising a flexible sealing member, wherein the flexible sealing member comprises, seen in cross section:
   an annular attachment part;
   an annular strip shaped sealing part which is connected to said attachment part by means of an annular hinge portion of said sealing part, and which sealing part extends away from said attachment part in a direction which has a first component in a direction which is parallel to the axis of the annular attachment part; and
   an annular strip shaped actuator part extending from said hinge portion of said sealing part in a direction which has a component in the radial direction.

12. The offshore wind turbine structure according to claim 2, wherein said strip shaped actuator part is provided with a thickened portion at its radial outer end.

13. The offshore wind turbine structure according to claim 12, wherein said sealing member is designed such that said thickened portion engages said attachment part, after the tubular members are interconnected.

14. The offshore wind turbine structure according to claim 2, wherein said flexible sealing member is made of rubber.

15. The sealing system according to claim 3, wherein said strip shaped actuator part is provided with a thickened portion at its radial outer end.

16. The sealing system according to claim 15, wherein said sealing member is designed such that said thickened portion engages said attachment part, after the tubular members are interconnected.

17. The sealing system according to claim 3, wherein said flexible sealing member is made of rubber.

* * * * *